Patented Oct. 19, 1937

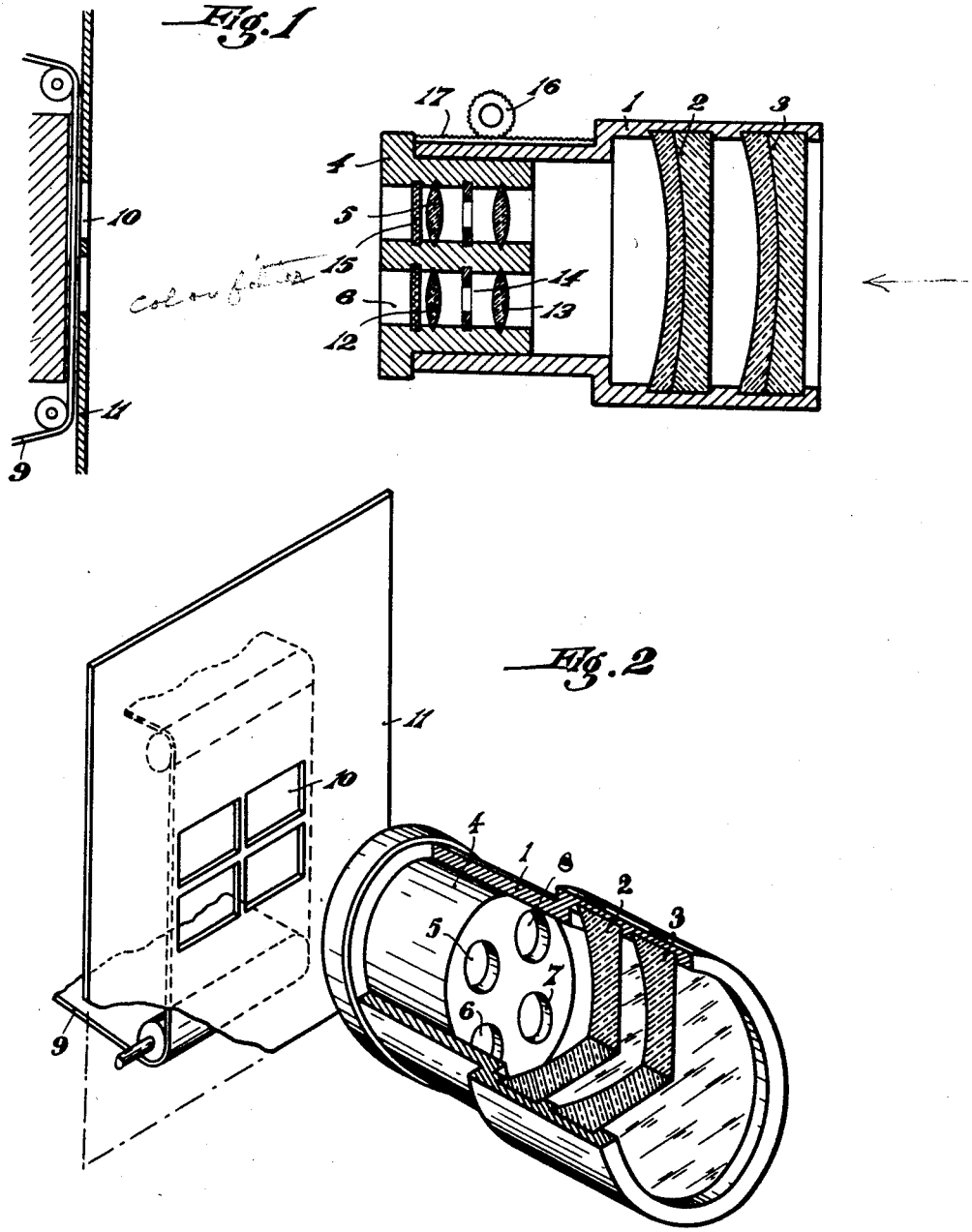

2,096,665

UNITED STATES PATENT OFFICE 2,096,665

PHOTOGRAPHIC OBJECTIVE

Joseph Audibert, Villeurbanne, France, assignor to Cinecolor S. A., Geneva, Switzerland, a corporation of Switzerland Application August 19, 1935, Serial No. 36,890

3 Claims. (Cl. 88—57)

The present invention relates to photographic objectives for taking colored photographs and motion pictures. More particularly the invention concerns multiple objectives of the type comprising a group of dividing objectives provided each with a suitable color filter and a divergent lens system placed ahead of the dividing objectives.

The object of the present invention is the provision of a photographic objective of the above type having an increased optical efficiency.

It is known that it is difficult or even impossible to manufacture a divergent lens of short focus and large diameter having a relative opening equal to about one.

The invention consists in a photographic objective comprising a divergent optical front system composed of two divergent lenses having each a relative opening which permits easy manufacturing of the lens, but which are placed relative to each other in such a manner that the relative opening of the divergent system as a whole is approximately equal to one.

The accompanying drawing represents by way of example a preferred embodiment of a photographic objective according to the invention.

Figure 1 is an axial section of the objective.

Figure 2 is a perspective view thereof, partly drawn in section.

The represented objective comprises a mounting 1 in which are fixed, towards its front end, two spaced divergent lenses 2 and 3 composed each of two or more elementary lenses. The useful diameter of the two lenses may be for example 90 millimeters; the front lens has a focus of 160 millimeters and the rear lens of 180 millimeters, for example, and the distance between the two lenses is such that the divergent system as a whole has a relative opening equal to $F=1$.

In the rear of the two divergent lenses, the mounting 1 carries a dividing objective 4, provided with four elementary objectives 5, 6, 7 and 8. The two divergent lenses 2 and 3 form in front of them an image of the subject to be photographed, which image is approximately reduced to a plane. The dividing objectives 5, 6, 7 and 8 are focussed on this plane and project four identical images of the subject on the film 9 which moves behind the four apertures 10 in the wall 11 of the motion picture camera.

Each of the four dividing objectives is formed of two convergent elements 12 and 13 between which there is mounted a diaphragm 14, and of a color filter 15. The mounting 1 with the whole of the divergent lenses and the four dividing objectives can be moved relative to the plane of the film 9 in order to focus the objective, for example by means of a pinion 16 and a rack 17 as shown.

For printing positive films in natural colors by means of pinatypic dies, it is necessary to have a black and white image which produces the marking of the image on the film. The represented objective having a group of four dividing objectives, is destined for use in four color printing. Three of the dividing objectives are provided with blue, green and red color filters, respectively, and with diaphragms having openings the diameter of which is chosen so as to obtain equal exposing time for all four images notwithstanding the difference in the chromatic sensibility of the emulsion of the film. The fourth of the dividing objectives is provided with a yellow color filter, or orthochromatic filter producing an image which is resembling an ordinary black and white image. This latter image will first be copied on the positive film. The three other images taken with the blue, green and red color filters, will furnish pinatypic dies and after being impregnated or inked will be copied on the positive film having already a slight black and white image.

It is to be understood that the invention is not limited to the form of embodiment as disclosed in the drawing. Particularly the dividing objective 4 could be provided with another number of elementary objectives, as for example two, three or more than four objectives each combined with a certain color filter.

An objective of the type disclosed can be used also for two-color photography, for the process of color turning, for dyeing after mordanting, or for impression of films having multiple sensitized layers.

I claim:

1. The combination with a photographic multiple objective composed of a group of dividing objectives each provided with a color filter and a diaphragm, of a divergent front system in axial alignment with and axially spaced from said multiple objective, said front system forming a virtual image of the object field adapted to be taken up by said dividing objectives, said front system comprising two divergent plano-concave lens elements each having a relatively large aperture opening, and the concavity of both lens elements being directed towards the multiple objective.

2. The combination with a photographic multiple objective composed of a group of dividing objectives each provided with a color filter and a diaphragm, of a divergent front system disposed in axial alignment with and axially spaced from said multiple objective, said divergent front system being in fixed optical relationship with said multiple objective and forming a virtual image of the object field adapted to be taken up by each of the dividing objectives, said front system comprising two divergent plano-concave lens elements each having a relatively large aperture opening, the plane surface of each lens element being directed away from the multiple objective, and the relative opening of the divergent system as a whole being substantially equal to 1.

3. The combination with a photographic multiple objective composed of a group of dividing objectives each provided with a color filter and a diaphragm, of a divergent front system in axial alignment with said multiple objective, said divergent front system being in fixed optical relationship with said multiple objective and axially spaced therefrom to form a virtual image of the object field adapted to be taken up by each of said dividing objectives, said divergent front system comprising two divergent plano-concave lens elements each having a relatively large aperture opening, the plane surface of each lens element being directed away from the multiple objective and the two divergent lens elements of the front system being axially spaced to obtain a focal length of the front system as a whole equal to substantially one half of the focal lengths of each of the two elements.

JOSEPH AUDIBERT.